May 8, 1962  H. E. HULL ETAL  3,032,944
CONTAINER AND CARRIER ASSEMBLING MACHINE
Filed Dec. 24, 1959  10 Sheets-Sheet 1
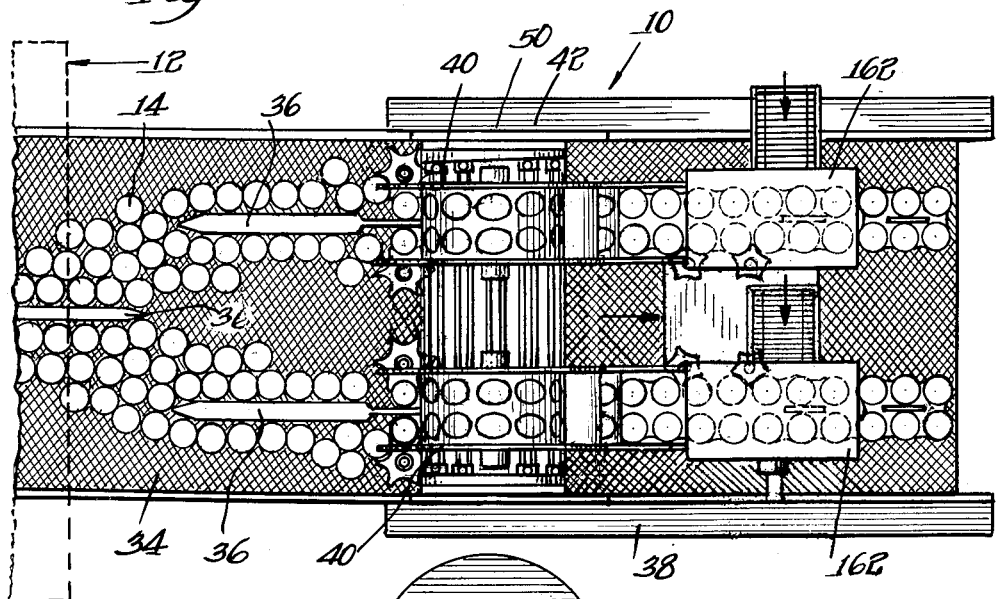
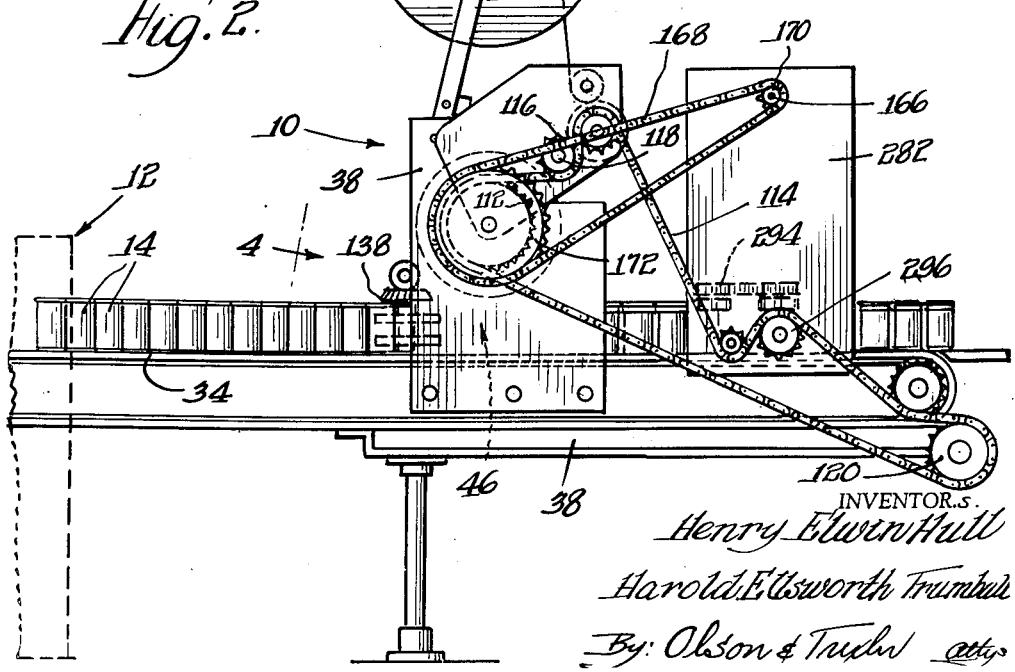
INVENTORS.
Henry Elwin Hull
Harold Ellsworth Trumbull
By: Olson & Trexler attys

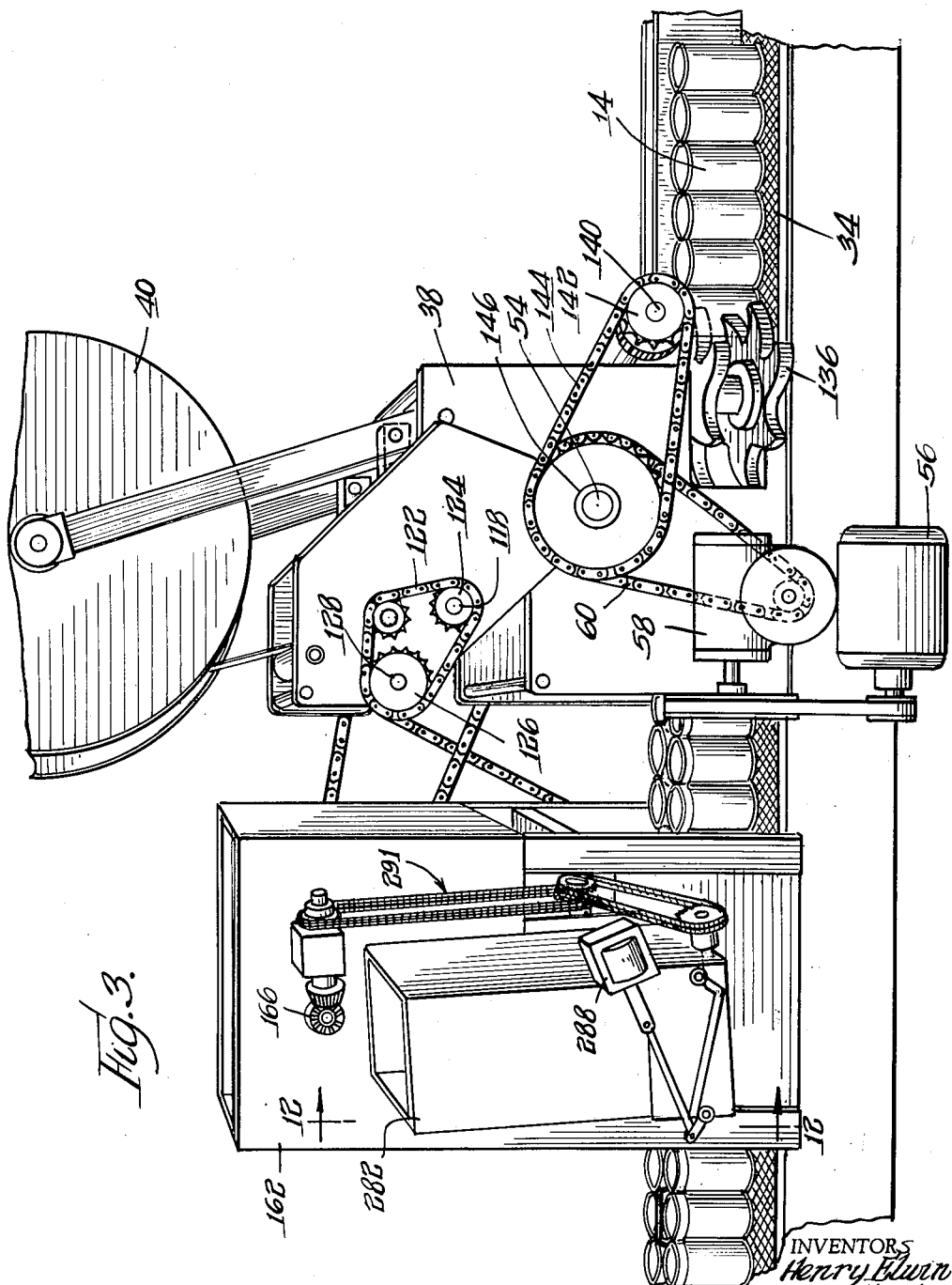

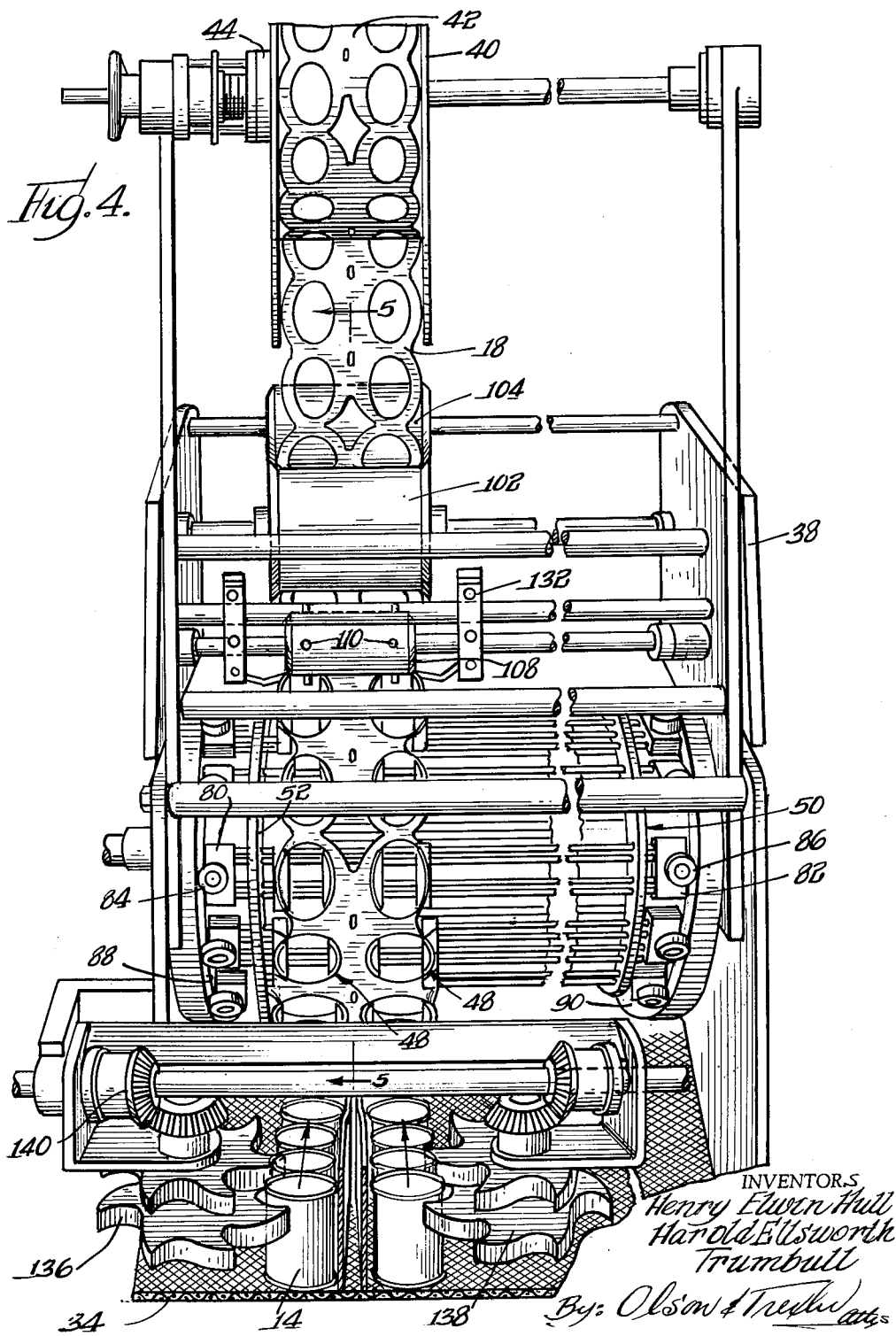

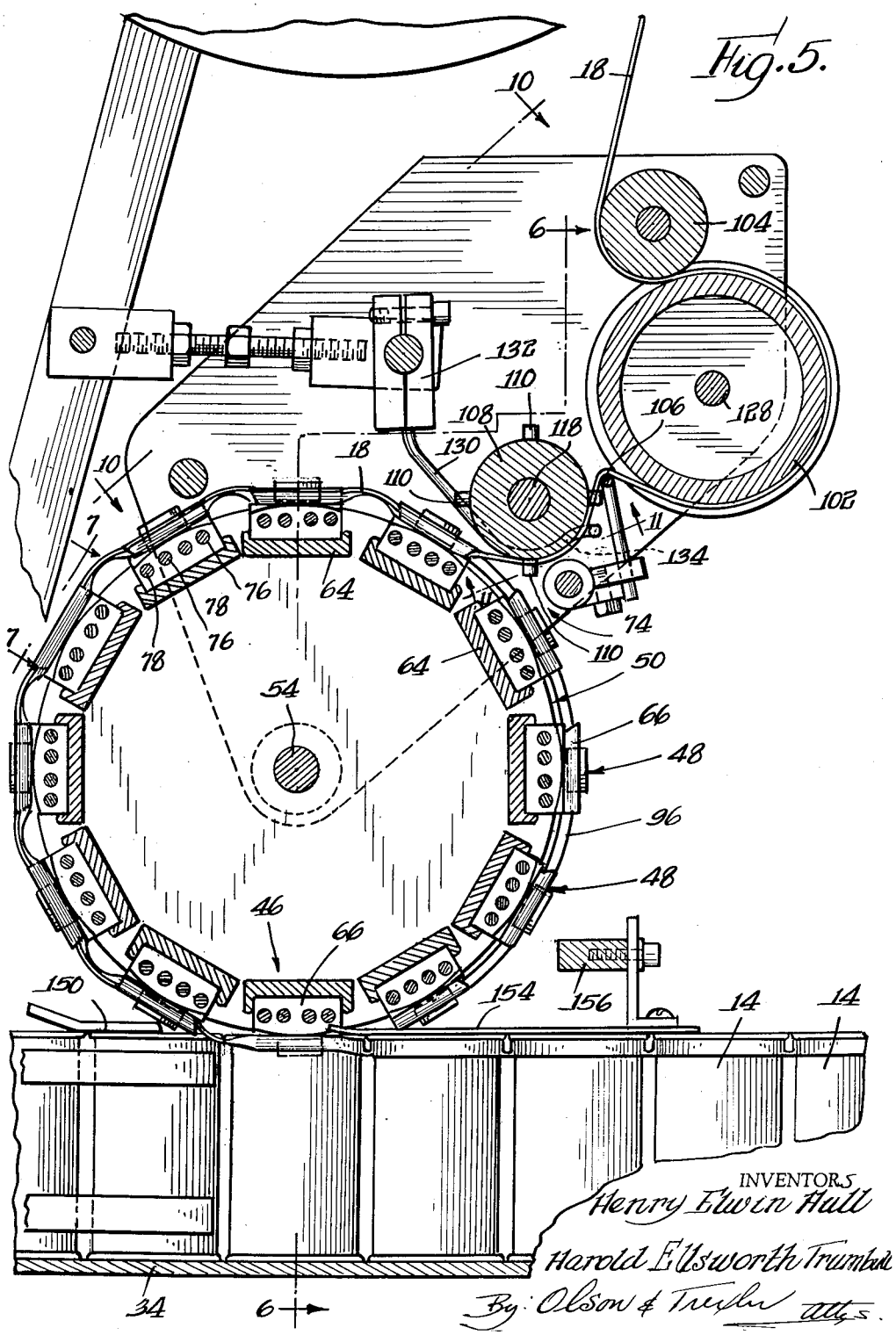

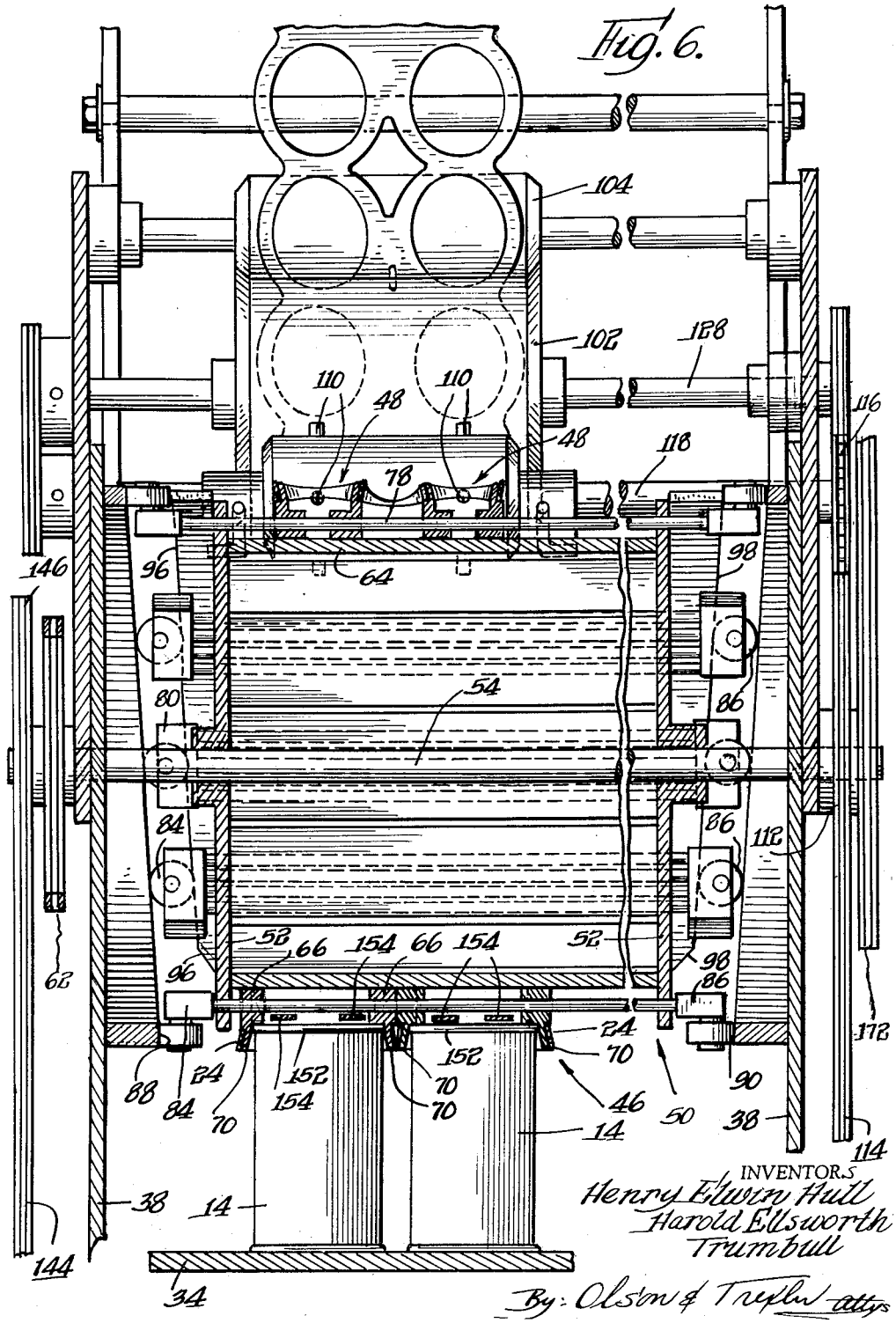

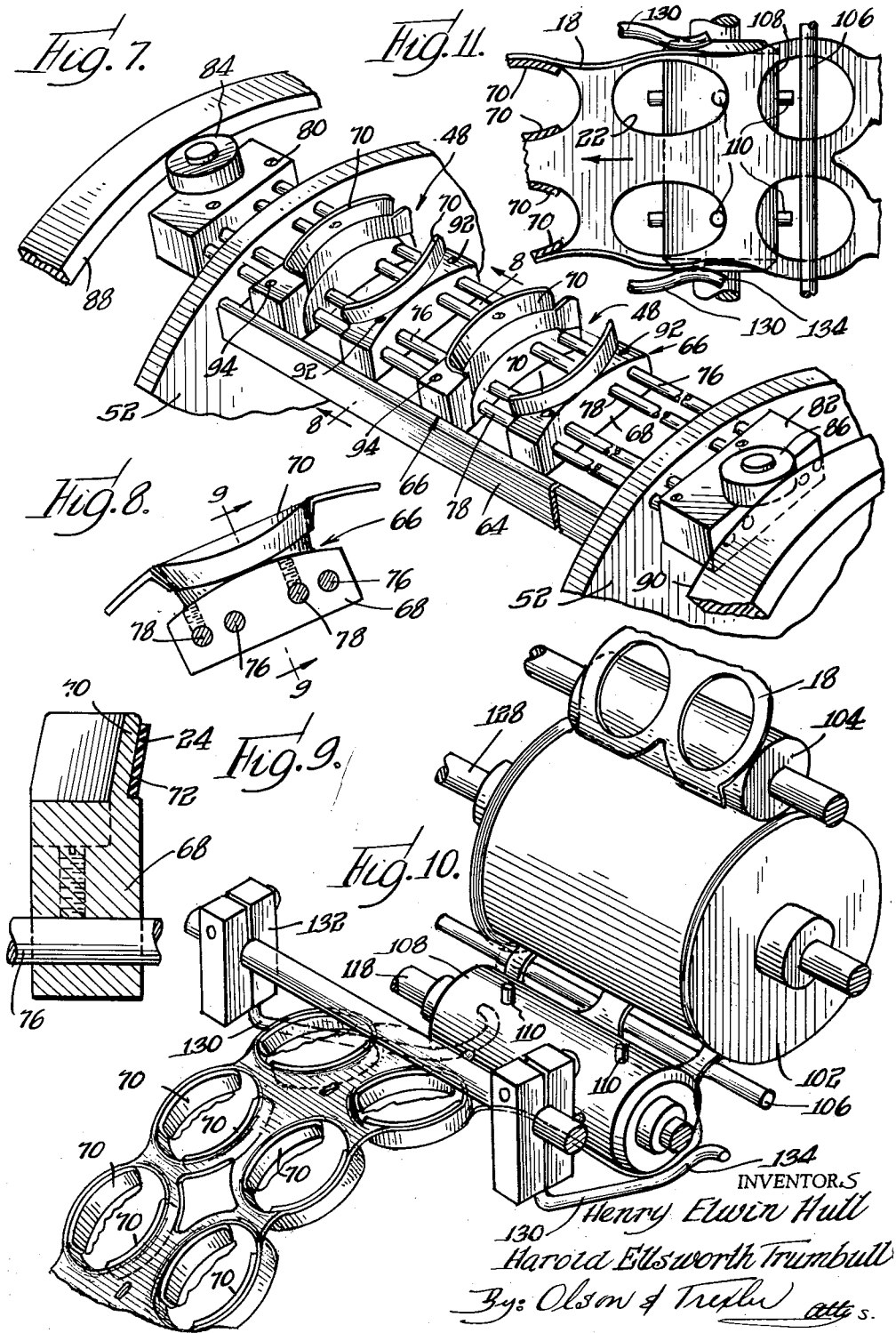

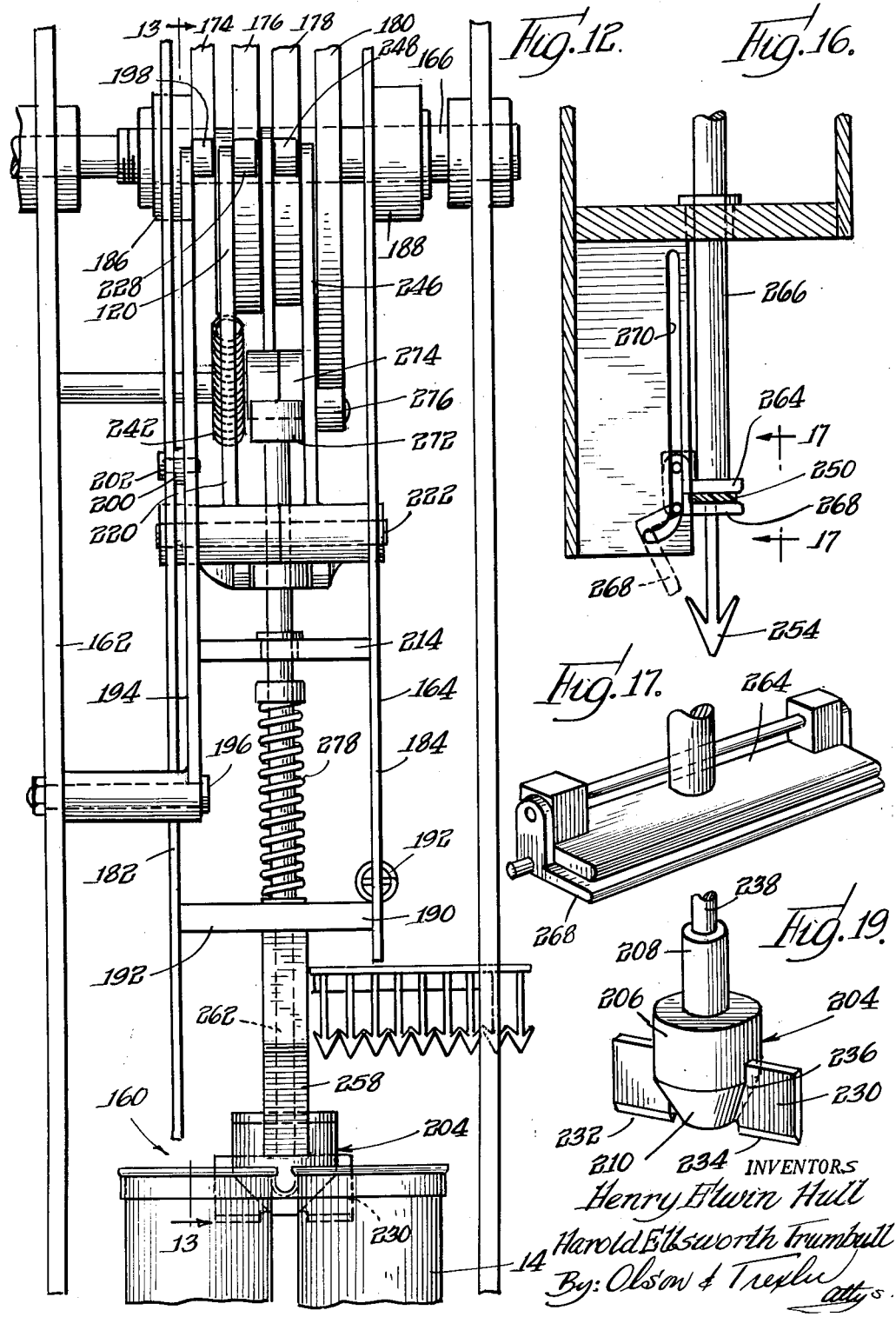

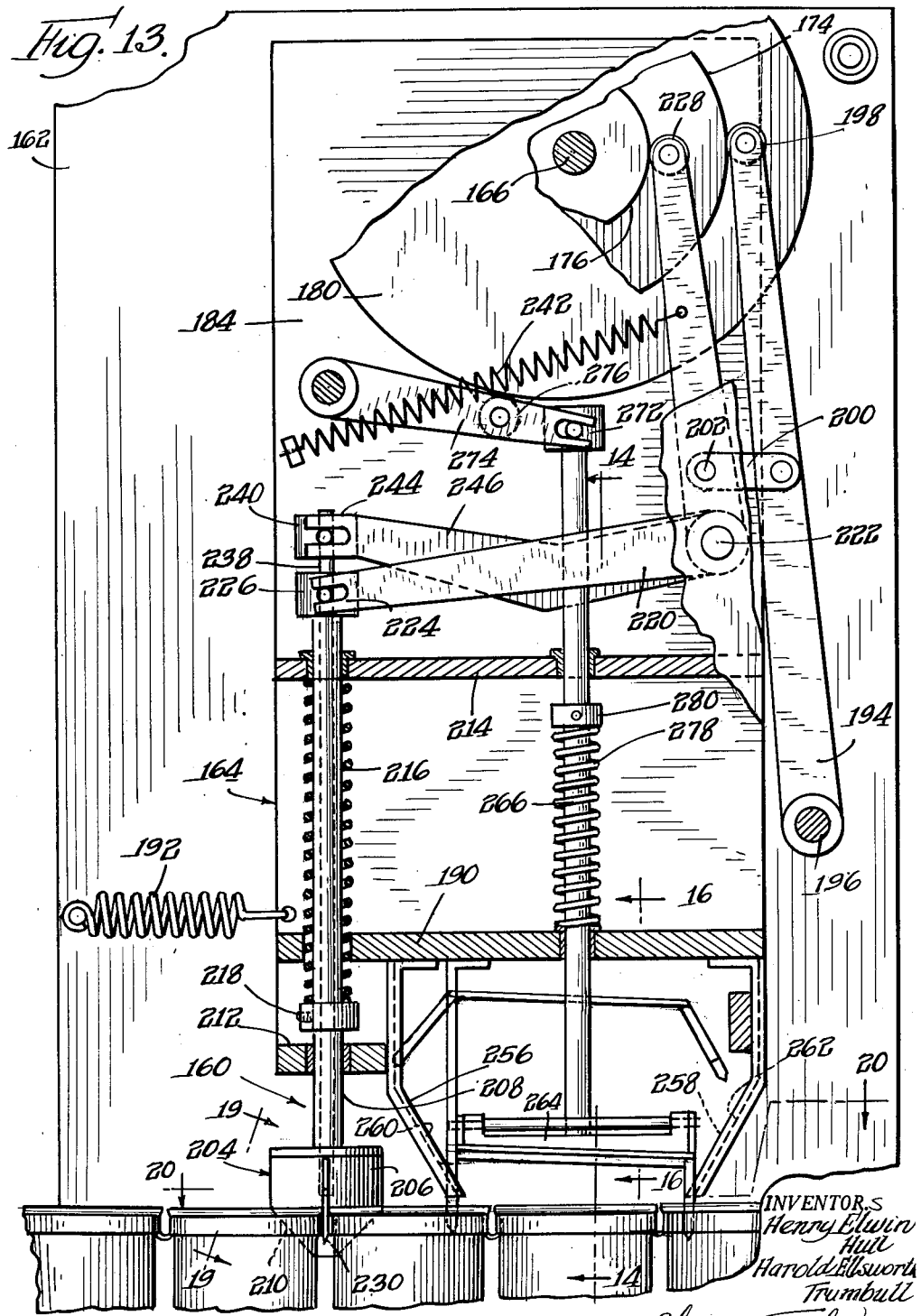

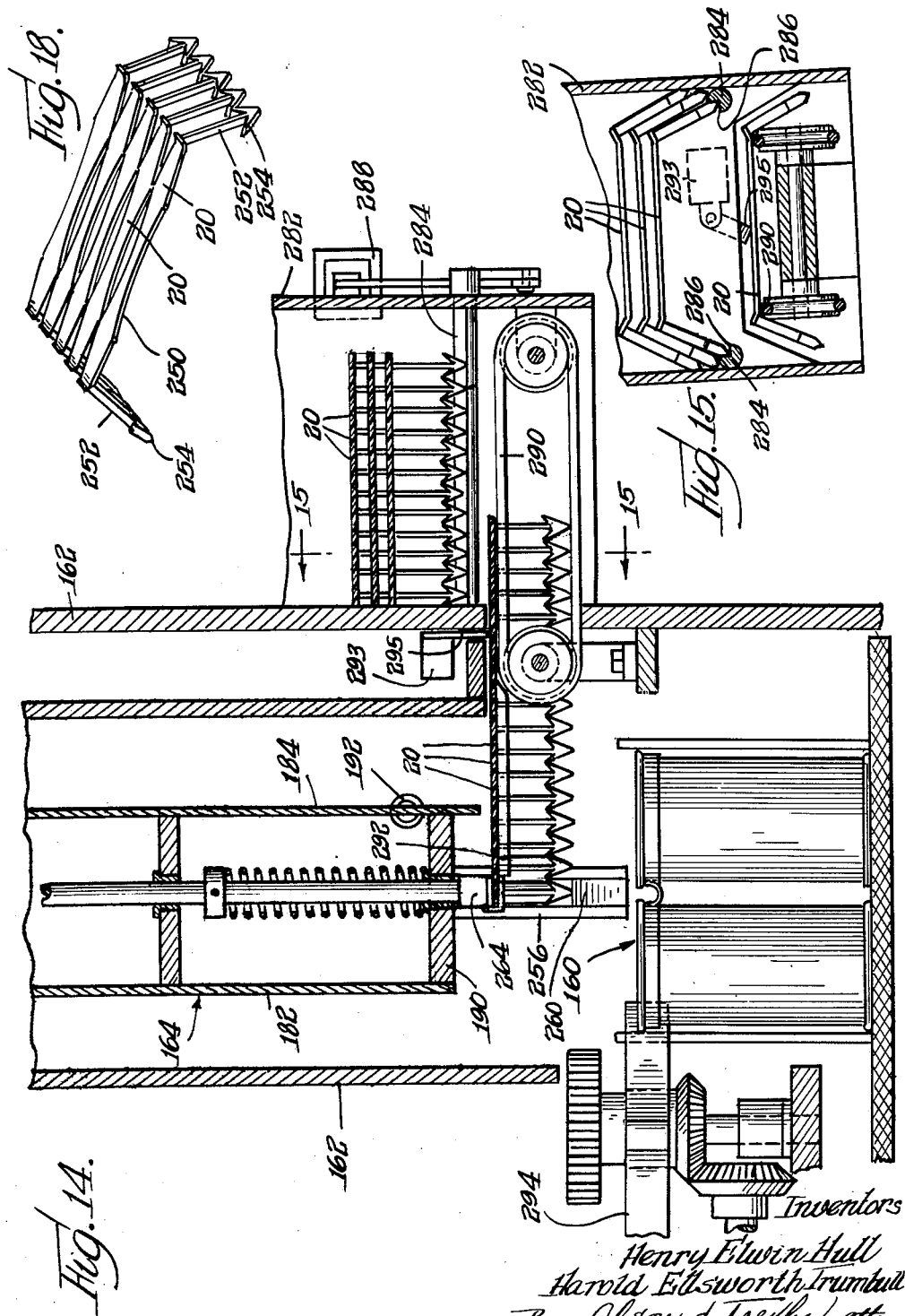

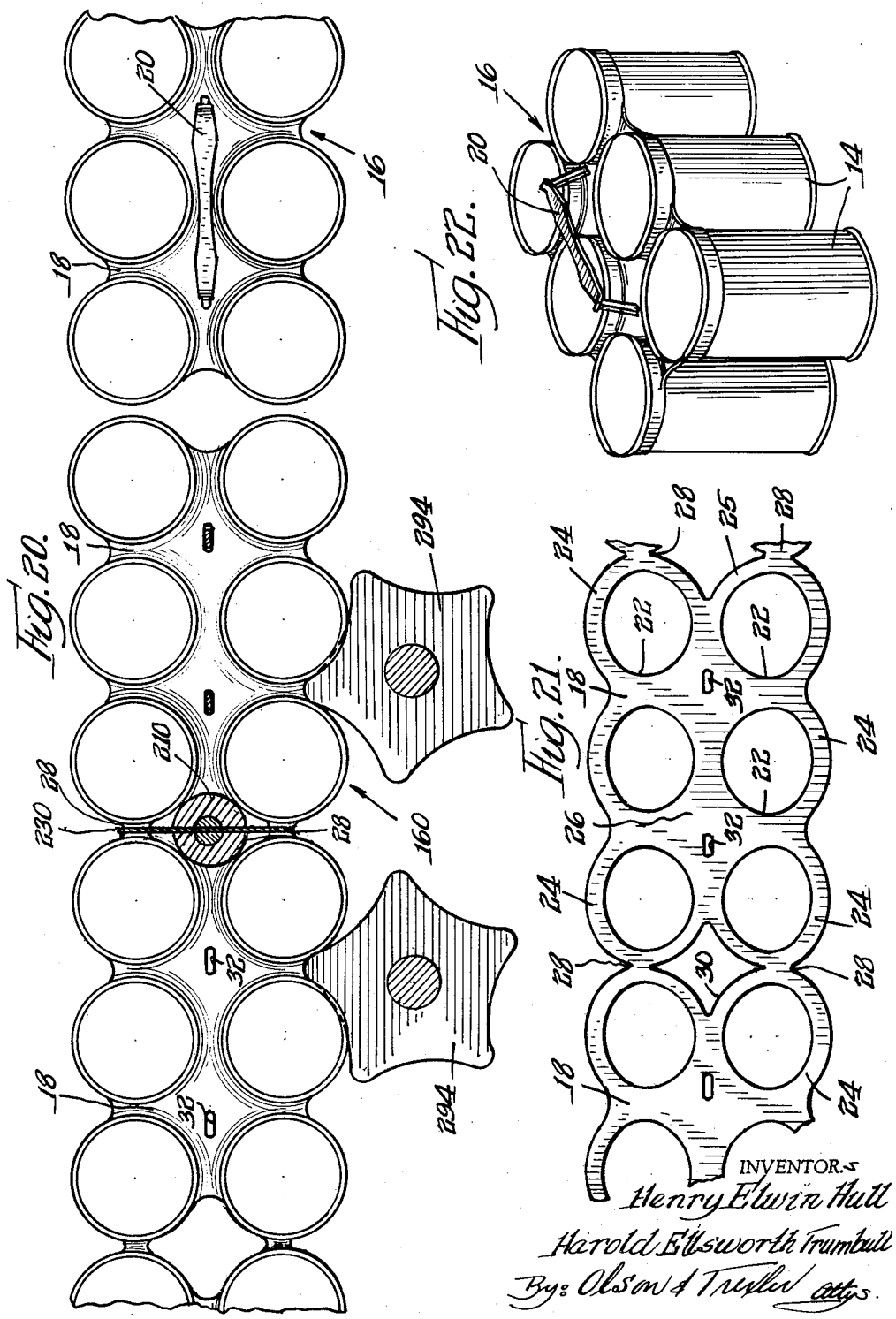

United States Patent Office 3,032,944
Patented May 8, 1962

3,032,944
CONTAINER AND CARRIER ASSEMBLING MACHINE
Henry Elwin Hull and Harold Ellsworth Trumbull, Columbus, Ohio, assignors, by mesne assignments, to Illinois Tool Works, Inc., a corporation of Illinois
Filed Dec. 24, 1959, Ser. No. 861,811
30 Claims. (Cl. 53—48)

The present invention relates to a machine for assembling containers and container carriers to form packs of containers which are convenient for carrying. Container carriers of the type which are assembled with containers by the machine provided by this invention are shown in U.S. Patent No. 2,874,835 issued to Ougljesa J. Poupitch. One example of containers which can be advantageously assembled into such carriers to form carrying packs are cylindrical metal containers with beaded ends, commonly referred to as "tin cans," which are so extensively used to contain food and beverages.

One object of the invention is to provide a new and improved machine for assembling containers and apertured carriers to form assembled packs of containers for carrying.

Another object is to provide an improved container and apertured carrier assembling machine which is capable of assembling containers and carriers at a high rate of production.

A further object is to provide an automatic container and carrier assembling machine which will operate with great inherent efficiency and speed to assemble containers into apertured and somewhat elastic carriers, which, as such, have a generally flat form in their undistorted state.

Another object is to provide for use with a high output container filling and closing machine, such as those used by breweries to produce filled cans of beer, an attachment adapted to receive a continuous procession of containers from the machine and assemble the containers into a succession of apertured carriers to form packs of containers ready for carrying.

Another object is to provide a new and improved machine in which a procession of containers is assembled into an interconnected series of apertured and somewhat elastic carriers by means of a rotor bearing unique, circumferentially arranged means for picking up the interconnected carriers and telescoping the carriers around the containers.

A further object is to provide a unique and fully synchronized machine for rapidly assembling a procession of containers with an interconnected series of apertured and somewhat elastic carriers to form disconnected packs of containers individually fitted with carrying handles by the machine.

Another object of the invention is to provide a novel container and interconnected carrier assembling machine as recited in the above objects which includes unique and highly efficient means for fitting carrying handles on the individual packs assembled in the machine.

Other objects and advantages will become apparent from the following description of the exemplary form of the invention illustrated in the drawings, in which:

FIG. 1 is a somewhat simplified plan view of the machine or attachment forming the exemplary embodiment of the invention;

FIG. 2 is a side elevational view of the machine of FIG. 1;

FIG. 3 is an elevational view on an enlarged scale showing the side of the machine opposite from that appearing in FIG. 2;

FIG. 4 is a perspective view of the machine taken generally with reference to the line 4—4 of FIG. 2;

FIG. 5 is a longitudinal vertical sectional view of the machine taken along the line 5—5 of FIG. 4;

FIG. 6 is a transverse vertical sectional view taken with reference to the line 6—6 of FIG. 5;

FIG. 7 is a fragmentary perspective view taken with reference to line 7—7 of FIG. 5 and showing carrier applying elements on the rotor assembly;

FIG. 8 is a fragmentary sectional view taken with reference to line 8—8 of FIG. 7 and showing a side view of a carrier applying element on an enlarged scale;

FIG. 9 is a fragmentary sectional view taken along the line 9—9 of FIG. 8;

FIG. 10 is a somewhat simplified perspective view taken with reference to the line 10—10 of FIG. 5;

FIG. 11 is a fragmentary view taken with reference to the line 11—11 of FIG. 5;

FIG. 12 is a vertical sectional view taken along the line 12—12 of FIG. 3;

FIG. 13 is a vertical sectional view taken along the line 13—13 of FIG. 12;

FIG. 14 is a vertical sectional view taken along the line 14—14 of FIG. 13;

FIG. 15 is a vertical sectional view taken along the line 15—15 of FIG. 14;

FIG. 16 is a fragmentary sectional view taken along the line 16—16 of FIG. 13;

FIG. 17 is a fragmentary perspective view with reference to the line 17—17 of FIG. 16;

FIG. 18 is a perspective view of adjoined plastic handles which are supplied for assembly by the machine;

FIG. 19 is a fragmentary perspective view of pack spacing and carrier severing elements taken with reference to line 19—19 of FIG. 13;

FIG. 20 is a simplified horizontal sectional view taken generally with reference to line 20—20 of FIG. 13;

FIG. 21 is an elevational view of interconnected carriers which are supplied in roll form for assembly by the machine; and FIG. 22 is a perspective view of a carrying pack of containers assembled by the machine.

The improved machine 10 forming the exemplary embodiment of the invention is inherently well suited to be used as an attachment applied to a container filling and closing machine 12, indicated in phantom in FIG. 1, to receive a procession of filled and closed containers 14 from the filling and closing machine and assemble the containers into individual packs 16, FIGS. 20 and 22, held together by apertured carriers 18 telescoped around the containers 14 of the respective packs and fitted with individual carrying handles 20.

It has been well recognized that in the retailing of many commodities, which are packaged in containers and sold to customers who usually buy more than one container at a time, many merchandising advantages are gained by assembling the containers into packs convenient for carrying. Canned beer is one of the most common examples of a commodity supplied to retailers in packs of containers ready for carrying. Ordinarily, the individual containers which contain the beer are common "tin cans" cylindrical in form and have radially protruding beads at opposite ends.

Hence, for the purpose of illustration, it may be assumed that the previously mentioned container filling and closing machine 12 is a typical machine such as that used in a brewery to produce and discharge a procession of cylindrical, beaded cans 14 filled with beer.

The machine attachment 10 provided by this invention is especially well suited to rapidly assemble the cans 14 issuing from the machine 12 into apertured and somewhat elastic carriers 18, previously mentioned with reference to FIGS. 20 and 22, which have the general construction illustrated in the previously mentioned Poupitch Patent No. 2,874,835.

Preferably, the individual carriers 18 are formed of a rather thin, tough and somewhat elastic material such as polyethylene. The individual carriers 18 shown in FIGS. 20 and 22 and used with the improved machine 10 are designed to hold together packs of six cans arranged into adjacent rows of three cans each as shown. For this reason, each individual carrier has a somewhat rectangular form overall and is apertured to define six container receiving apertures 22 arranged in two rows of three apertures each.

The individual apertures 22 are made somewhat smaller than the cans 14 to be received. As shown, the apertures 22 are somewhat elongated along the length of the carrier.

Each carrier 18 is substantially flat in its undistorted state, FIG. 21. The opposite longitudinal edges and the opposite end edges of each carrier 18 are undulated as shown to leave only a rather narrow flat band of material 24 bounding the side portions of the respective apertures 22 remote from the adjacent apertures in the carrier. A central web portion 26 of the carrier extends between the adjacent apertures 22.

Preferably the carriers 18, as manufactured, are joined together at adjacent ends by connecting webs 28, as shown in FIG. 21, to form a continuous strip of carriers which are supplied in roll form for feeding into the machine 10 in a manner to be described. Actually, the two webs 28 adjoining adjacent ends of adjacent carriers 18 are very narrow and are little more than short junctures between the band portions 24 bounding the end apertures 22 of adjacent carriers.

The rather short extent of the carrier adjoining webs 28 together with the narrow form of the marginal edge portions 24 of the carriers bounding the end apertures 22 defines between the adjoining ends of adjacent carriers a diamond shaped opening 30 having somewhat concave sides as shown. The presence of this opening 30 between adjoining carriers 18 provides clearance for insertion of a pack spacing element of the carrier and container assembling machine 10 as will presently appear.

Two spaced openings 32 in the central web portion 26 of each carrier 18, FIG. 21, are adapted to receive opposite ends of a carrying bail or handle 20 inserted by the machine 10 as will presently appear.

Interconnected plastic carriers 18 are supplied in rolls for use in the machine 10. The particular machine 10 illustrated in the drawings, FIGS. 1, 4, and 6, is a duplex machine which divides the output of cans 14 from the machine 12 into separate channels to form two separate but parallel processions of cans which move simultaneously through the machine 10 with two cans abreast in each procession. The structure of the machine 10 which assembles the cans into carrier packs is duplicated as necessary to serve the two parallel processions of containers moving through the machine 10 as will presently appear.

The ensuing description will be directed specifically to the construction of the machine 10 which serves to assemble carriers with the cans in only one of the two processions of cans moving through the machine. It will be understood that the machine structure provided for assembling carriers with cans in the other procession is similar in design to that specifically illustrated and described.

As shown in FIGS. 1 to 3, filled cans 14 issuing from the filling and closing machine 12 are received by an endless belt conveyor 34 and carried through the packaging machine 10. Suitable guides 36 overlying the conveyor 34 at the intake side of the packaging machine 10 assist in directing the filled cans 14 into two separate processions of cans which move through the machine in parallel relation to each other as will presently appear.

A frame 38 of the machine 10 supports the conveyor 34 and extends transversely across the conveyor as shown in FIG. 3. A pair of large carrier supply reels 40 surmount the frame 38 as shown in FIGS. 1 to 4 to contain two rolls 42 of interconnected carriers 18. The two reels 40 are mounted in axially spaced relation to each other and supply interconnected carriers 18 to the two operating channels of the machine 10 which serve the parallel processions of cans. Each reel 40 is equipped with a suitable retarding brake 44, FIG. 4, for preventing overrunning of the reel as the interconnected carriers 18 are pulled from the roll 42 of the reel as will presently appear.

The conveyor 34 carries each procession of cans 14 through a carrier and can assembly station or zone 46 indicated generally by the reference numeral 46 in FIGS. 2, 5 and 6. As the cans 14 move through the assembly station 46 two abreast, the cans are assembled with a succession of carriers 18 which are picked up from the associated reel supported roll 42 and applied to the cans by a circumferential series of carrier applying elements 48 on a rotor 50 rotatably mounted on the frame 38 in overlying relation to the assembly station.

As will presently appear, the carrier applying elements 48 in the illustrated machine 10 have a circumferential spacing from each other along the periphery of the rotor 50, which conforms to but somewhat exceeds the spacing of adjacent apertures 22 along the length of the respective carriers 18.

The rotor 50 comprises, as shown in FIG. 6, a pair of axially spaced support discs 52 non-rotatably mounted on a central support and driving shaft 54 journaled in the frame 38. The shaft 54 is rotated to turn the rotor 50 by means of an electric motor 56 which drives a speed reducer 58, FIG. 3, connected by a sprocket chain 60 to a sprocket wheel 62 on the shaft 54.

A plurality of circumferentially spaced support channels 64 extend axially between the rotor discs 52, as shown in FIGS. 5, 6, and 7, in underlying relation to the circumferentially spaced carrier applying elements 48 to provide radial support to the latter as will presently appear. The circumferentially spaced carrier applying elements 48 are provided in pairs having a transverse spacing from each other across the peripheral face of the rotor 50, as shown in FIGS. 4, 6, and 7, which conforms to the transverse spacing of the carrier apertures 22.

Each of the carrier applying elements 48 comprises a pair of opposed aperture expanding shoes 66 formed substantially as mirror images of each other as shown in FIGS. 7 to 9. Each shoe 66 has a support base 68 slideably mounted on its underlying support channel 64 for movement toward and away from the opposing shoe 66 of the same pair. The base 68 of each shoe 66 supports a carrier aperture expanding and deflecting lip 70 which projects radially outward and has a generally arcuate shape as viewed from its radially outward end. The lips 70 are relatively thin, as shown in FIG. 9. The general form of the aperture expanding lips 70 may be aptly described as quadrants of a truncated cone which diverges radially outward.

As viewed from their radially outward ends, the aperture expanding lips 70 have radii of curvature substantially greater than one half the average diameter of the carrier apertures 22 and substantially greater than one half the diameter of the cans 14 to be assembled into the carriers. As shown in FIGS. 8 and 9, each lip 70 defines an external carrier engaging surface 72 formed as a segment of a truncated, outwardly diverging cone and having a radial width approximately equal to that of the peripheral portions 24 of the carriers 18 bounding the apertures 22, as previously described in relation to FIG. 21.

The two aperture expanding shoes 66 of each carrier applying element 48 are moved toward each other to fit the associated expanding lips 70 into a carrier aperture 22 and are moved away from each other to expand the carrier aperture automatically as an incident to rotation of the rotor 50 as will presently appear. Thus, the opposed shoes 66 are separated to their fullest degree as the shoes approach the can and carrier assembly station 46 by counter-clockwise movement of the rotor 50 with reference to FIG. 5. The opposed shoes 66 are again moved back into proximate relation to each other as they are carried from the assembly station 46 by counter-clockwise movement of the rotor 50 to a carrier supply or feeding station indicated generally by the numeral 74 in FIG. 5. As shown, the carrier supply station 74 is spaced circumferentially around the rotor 50 from the assembly station 46 by a radial angle greater than 180° measured in a direction opposite to rotation of the rotor.

The two shoes of each pair of shoes 66 slidably supported on each support channel 64 are moved toward and away from each other in timed relation to turning movement of the rotor 50 by two pairs of shoe operating rods 76, 78 slidably mounted at opposite ends in the rotor discs 52 and extending transversely across the rotor in outwardly spaced, parallel relation to the associated support channel as shown in FIG. 7. All four of the rods 76, 78 extending along each channel 64 extend through the base 68 of each shoe on the channel, FIG. 8.

Having reference to FIGS. 4 and 7, the pair of rods 76 extends beyond the left hand rotor disc to connect with an operating block 80 and the corresponding pair of rods 78 extends beyond the other rotor disc 52 to connect with an operating block 82. The respective operating blocks 80, 82 journal two cam following rollers 84, 86, which oppose two annular operating cams 88, 90 mounted on the frame 38 at opposite ends of the rotor 50 in concentric relation to the rotor, as shown in FIGS. 4, 6, and 7. The cams 88, 90 are shaped to move the followers 84, 86 progressively toward each other as the followers are carried by the rotor from the carrier supply station 74 to the assembly station 46.

This movement of the followers 84, 86 toward each other is transmitted through the rods 76, 78 to move the two shoes of each associated pair of shoes 66 away from each other. For this purpose, the pair of rods 76 operated by the left-hand follower 84 with reference to FIG. 7 are clamped by set screws 92 to the base 68 of the right-hand shoe of each pair of shoes 66 traversed by the rods. Similarly, the pair of rods 78 operated by the follower 86 are clamped by set screws 94 to the base of the left-hand shoe of each pair of shoes 66 traversed by the rods.

Movement of the two shoes of each pair of shoes 66 toward each other as they progress from the assembly station 46 to the station 74 is effected by engagement of the associated cam followers 84, 86 with a pair of arcuate cams 96, 98, FIG. 6, extending from the assembly station to the supply station in opposing relation to the cams 88, 90.

At the carrier supply station 74, carriers 18 are supplied to the carrier applying elements 48 moving past the supply station in a manner which assures that the marginal edges of the carriers defining the carrier apertures 22 will be cupped or turned toward the axis of the rotor 50 as the lips 70 of the shoes 66 fit into the carrier apertures 22, thus providing, as will presently appear, the desired relationship between the carriers 18 and the cans 14 as they are subsequently assembled together in the assembly station 46.

Interconnected carriers 18 are directed from the roll 42 to the carrier supply station 74 by a feed roll 102, FIGS. 4, 5, and 10, power driven in synchronization with the rotor 50. Preferably, the interconnected carriers are trained around an idler roll 104 onto the feed roll 102 to extend around the latter more than 180° to a transverse guide bar 106. The carriers leave the roll 102 to slide over the guide bar 106 and turn downwardly for engagement with a timing roll 106 which cooperates with associated structure to aid in producing the desired cupping of the marginal edges of the carrier apertures 22 as the latter are expanded by the shoes 66.

Positive interlocking of the timing roll 108 with the carriers 18 extending around this roll is provided by four pairs of radial projections 110 protruding from the periphery of the roll 108. The two projections 110 of each pair are spaced apart along the length of the roll 108 to a degree equal to the lateral spacing between the apertures 22 in the carriers. The four pairs of projections are evenly spaced around the roll 108, which is dimensioned circumferentially to extend the projections 110 into the apertures of the carriers moving off the guide bar 106.

The timing roll 108 is driven in synchronization with the rotor 50 by means of a sprocket wheel 112 on the rotor shaft 54, FIGS. 2 and 6, which is connected by a sprocket chain 114 with a sprocket wheel 116, FIG. 2, on the main shaft 118 for the timing roll.

The feed roll 102 is driven in synchronization with the timing roll 108 by a sprocket chain 122, FIG. 3, extending around a sprocket wheel 124 on the timing roll shaft 118 to transmit power from this shaft to a sprocket wheel 126 on the support shaft 128 for the feed roll.

The timing roll 108 is made somewhat shorter in length than the transverse width of the carriers 18, FIGS. 4, 10, and 11, so that the opposite marginal side edges of the carriers extend somewhat beyond opposite ends of the roll. The side edges of the carriers, which project beyond the roll 108, are engaged and deflected toward the axis of the roll 108 by a pair of deflecting arms 130 mounted on a suitable support 132 and cantilevering into operating positions located adjacent but immediately beyond opposite ends of the timing roll. The free ends of the deflecting arms 130 form curved deflecting elements 134 shaped, as shown in FIGS. 5, 10, and 11, to engage opposite side edges of the carriers projecting beyond opposite ends of the roll 108 and turn these edges toward the axis of roll 108 and away from the rotor to aid cupping of the carriers, as will be described presently in greater detail.

As previously described, the placement of the carrier applying elements 48 on the rotor 50 is such that the opposed shoe lips 70 moving through the carrier supply station 74 enter into the successive apertures 22 of the adjoined carriers. The position of the timing roll 108 relative to the rotor 50 and the rotary timing of the roll 108 relative to the rotor is such that the interconnected carriers are stretched somewhat in moving from the roll 108, where they are engaged by the projections 110, onto the rotor 50 where they are engaged by the radial lips 70. This stretching of the carriers together with the cupping or deflection of the marginal edges of the carriers by the deflecting arms 130 as described assists in causing the marginal edges of the carriers defining the openings 22 to cup radially inward as they are telescoped around the coacting pairs of carrier lips 70, as shown in FIGS. 8 to 10.

Movement of the procession of cans 14 into the assembly station 46 in timed relation to movement of the carrier applying elements 48 into the assembly station is accomplished by the conveyor 34, which is synchronized with the rotor 50 by means of the previously described sprocket chain drive to the conveyor from the rotor shaft, FIG. 2.

Further assurance of proper synchronization of the movements of the cans 14 and the can applying elements 48 into the assembly station 46 is provided by means of opposed pairs of tandem star wheels 136, 138, FIG. 4, mounted in overlying relation to the conveyor 34 to engage, respectively, the two columns of cans 14 in the procession entering one channel of the machine 10. The opposed star wheels 136, 138 are driven in synchronization with each other by a common drive, FIG. 4, which is energized by a sprocket wheel 142, FIG. 3, engaging a sprocket chain 144 extending around a sprocket wheel 146, FIG. 6, on the rotor shaft 54.

The cans 14 entering the assembly station 46 are positively held down against the underlying conveyor 34 by a suitably supported hold down blade 150, which engages the top of the cans as shown in FIG. 5.

The conveyor 34 supports the cans 14 at a vertical level relative to the rotor 50 such that the upper ends of the cans and the carrier applying shoes 66 extend into overlapping, telescoped relation to each other as the cans and the corresponding pairs of shoes move into the assembly station 46 in synchronization with each other. Thus, when the shoes 66 are spread apart and moved into their lowermost positions shown near the bottom of FIG. 6, the aperture expanding lips 70 of the shoes extend downwardly past the radial beads 152 on the upper ends of the cans 14. As a matter of fact, the extreme upper ends of the cans 14 extend substantially to the base of the lips 70, as shown.

As previously described, the carriers 18 are picked up by the aperture expanding lips 70 in such manner that the marginal edges of the carriers defining the apertures 20 are cupped to protrude radially inward toward the axis of the rotor 50. Hence, these inwardly protruding carrier edges, upon being telescoped over the cans 14, as described, protrude upwardly at their inner edges toward the can beads 152.

As the cans 14 move on through the assembly station 46 and the carrier applying shoes 66 swing upwardly from the assembly station, the upwardly turned edges of the carriers defining the apertures 22 are caught under the upper can beads 152. Moreover, a horizontal stripper element or blade 154 mounted on a suitable support 156 as shown in FIG. 5 overlies the cans and carriers on the cans issuing from the assembly station 46. The action of the stripper blade 154 together with the engagement of the carriers 18 with the cans removes the carriers from the applying shoes 66 as the latter swing upwardly from the assembly station 46 toward the carrier supply station 74. The cams 88 and 90 recede somewhat to relax the aperture expanding action of the opposing shoes 66.

In this manner, the interconnected carriers 18 are assembled with the procession of cans 14 in a continuous operation in which the cans and carriers move through the assembly station 46 without interruption.

The cans 14 assembled into the connected carriers 18 are moved by the conveyor 34 from the assembly station 46 to a pack severing and handle inserting station 160 in the machine 10, FIGS. 12, 13, 14, and 20, where the successive carriers are severed from each other and carrying handles 20 inserted into the individual carriers by mechanisms supported in a housing 162 and driven in synchronization with the rotor 50.

As will presently appear, the structural elements which will operate in the zone 160 to sever the adjacent packs and to insert the handles 20 are supported by a carriage 164 mounted in the housing 162 for limited movement along the path of the assembled cans and carriers to effect and maintain an alignment of the moving packs and the parts operating on the packs, while the latter are actively engaged with the packs.

As shown in FIGS. 12 and 13, the carriage 164 is vertically elongated and swingably supported at its upper end on a transverse shaft 166 journaled in the housing 162. The shaft 166 is rotated in synchronism with the rotor 50 by means of a sprocket chain 168, FIG. 2, connecting a relatively small sprocket wheel 170 on the shaft 166 with a larger sprocket wheel 172 on the rotor shaft 54, FIGS. 2 and 6. The shaft 166 is rotated through one complete revolution during the period in which six cans are assembled with a carrier 18 in the assembly station 46.

The shaft 166 drives four power cams 174, 176, 178, and 180 nonrotatably mounted on the shaft between two vertically elongated side plates 182, 184 of the carriage 164, as shown in FIG. 12. The carriage plates 182, 184 are swingably supported on the shaft 166 by suitable bearing elements 186, 188 and are connected together adjacent their lower ends by a relatively thick, generally horizontal transverse plate 190.

The carriage 164 overlies the path of the assembled cans and carriers moving through the previously mentioned station 160. The lower end of the carriage is urged to a forward, starting position with reference to the station 160 by means of a spring 192, FIG. 13, connected between the housing 162 and the lower end of the carriage. Once during the passage of an assembled package of six cans through the station 160, the lower end of the carriage 164 is swung rearwardly through a limited distance in alinement with the pack and then returned to its starting position.

This synchronized swinging movement of the carriage 164 is produced by a carriage swinging arm 194, FIGS. 12 and 13, supported at its lower end by a pivot 196 on the housing 162 and carrying at its upper end a cam following roller 198 which engages the cam 174 on shaft 176. The medial portion of the arm 194 is connected by a link 200 to a pivot 202 on the carriage plate 182 so that clockwise swinging movement of the arm 194 by the cam 174, with reference to FIG. 13, swings the lower end of the carriage 164 against a spring 192 rearwardly in the direction of movement of the underlying cans. The shape of the cam 174 is designed to provide the desired timing and speed of swinging movement of the carriage 164.

Each successive pack of assembled containers moving into the zone 160 is spaced somewhat from the succeeding pack by means of a combined pack spacer and severing knife guide 204, FIGS. 12, 13, and 19.

Structurally, the pack spacer and knife guide 204 comprises a cylindrical head 206 mounted on the lower end of a generally vertical operating sleeve 208 and having a depending lower end shaped in the form of a truncated cone 210 adapted to fit into the space 30, FIG. 21, between the ends of adjacent carriers 18 passing through the zone 160. The support sleeve 208 extends upwardly from the head 206 through a guide 212 on the lower end of the carriage 164 and through a transverse plate 214 mounted in the carriage in vertically spaced relation to the plate 190, FIG. 13. The sleeve 208 is urged downwardly by a rather strong helical compression spring 216 coiled about the sleeve between the plate 214 and a collar 218 secured to the sleeve between the plate 190 and the guide 212.

Synchronized operation of the spacer 206 is effected by means of a cam following bell crank 220, FIGS. 12, 13, medially supported on a transverse pivot 222 on the carriage 164. The bifurcated end 224 of a generally horizontal arm of the bell crank 220 connects with a collar 226 on the upper end of the sleeve 216. A cam following roller 228 journaled on the free end of a generally vertical arm of the bell crank 220 engages the cam 176 which swings the crank 220 in a clockwise direction with reference to FIG. 13 to raise the spacing head 206 against the force of the spring 216.

The cam 176 is shaped to hold the spacer 206 normally in a raised position. Simultaneously with movement of an opening 30 between carriers 18 into alinement with the spacer head 206, the cam 176 allows the spring 216 to move the head 206 downwardly to its lower position, illustrated in FIG. 13, in which the conical lower end 210 of the head enters the opening 30 to assure a minimum predetermined space between the cans 14 assembled into adjacent carriers 18. The head 206 remains briefly in this lower position and is moved along with the cans 14 by swinging movement of the carriage 164. During this interval the carriers 18 on opposite sides of the spacer head 206 are severed from each other by a knife 230, FIGS. 12, 13 and 19, mounted in the head 206 and extending transversely across the path of the carriers 18.

The severing knife 230 is formed by a horizontal blade (also denoted by the numeral 230) defining two laterally spaced cutting edges 232, 234 on its lower side slidably mounted in a vertical slot 236 in the lower end of the head 206 and projecting laterally beyond opposite sides of the head to define two downwardly facing cutting edges 232, 234.

The blade 230 is centrally connected to an operating stem 238 extending upwardly through the sleeve 208 to a control collar 240 above the upper end of the sleeve. The control sleeve 240 is connected to the bifurcated end 244, FIG. 13, of a bell crank 246 centrally supported on the pivot 222 and carrying at its opposite end a cam following roller 248, FIG. 12, engaging the cam 178. A tension spring connected to the bell crank 246, as shown in FIG. 13, urges this lever in a direction for forcing the knife 230 downwardly. The cam 178 is shaped to hold the knife 230 normally in a retracted position and allow the spring 242 to move the knife downwardly to serve the connecting webs 28, FIG. 20, between adjacent carriers 18 while the spacing head 206 is engaged in the opening 30 between the carriers as described.

In this manner, the adjacent carrier packs are severed from each other while moving continuously through the zone 160. Simultaneously with the spacing and severing of adjacent carrier packs, carrying handles or bails 20 are assembled into the successive carriers 18 passing through the zone 160.

The illustrated handles 20 assembled into the carriers 18 by the machine 10 are formed of a tough but somewhat flexible plastic material. As shown in FIG. 18, each handle 20 comprises a generally straight section 250 adapted to be grasped in one hand of the user. Opposite ends of the handle sections 250 connect with two diverging legs 252 terminating in arrow shaped anchors 254.

As supplied for use in the machine 10, adjacent handles 20 are joined together by weak junctures between the handles at spaced locations along the handles. The handles 20 thus adjoined in parallel relation to each other as shown in FIG. 18 are well adapted to be fed automatically into the machine 10 as will presently appear.

Suitable handle feeding means to be described later are provided to move the individual handles 20 laterally into the space between two handle guides 256, 258 mounted on the underside of the carriage 184 as shown in FIGS. 12 to 14 and converging downwardly into immediately overlying relation to the cans 14 passing through the zone 160.

The lower ends of the converging guides 256, 258 have a spacing from each other equal to that between the handle openings 32 in each carrier 18 and are located in relation to the pack spacer 204 to have an effective alinement with the handle openings 32 of a carrier 18 engaged at its trailing end by the spacer head 206 as described. The two guides 256, 258 are shaped in transverse sections to define similar grooves 260, 262, FIGS. 12, 13, and 14, facing toward each other and adapted to receive and guide downward movement of the handle anchors 254 as will presently appear.

The hand grip element 250 of a handle 20 moved laterally into alinement with the guides 256, 258 is engaged by the underside of a generally horizontal handle inserting shoe or pusher 264, FIGS. 13, 16, and 17, attached to the lower end of a vertically movable actuating plunger 266 mounted in the carriage 164. The underside of a handle element 250 underlying the pusher 264 is engaged by a retaining plate 268 swingably supported on the pusher 264 and operated by a cam 270, alongside the vertical path of the pusher, to underlie the bottom of the pusher when the latter is in its raised position shown in FIGS. 14 and 16.

As a carrier pack moves into the zone 160 where it is engaged by the spacer head 206 and severed from the adjacent pack by the knife 230, the pusher 264 is moved downwardly by the plunger 266 to insert a handle 20 into the carrier 18 of the pack. As the pusher 264 moves downwardly, the underlying handle element 250 is held between the pusher and the plate 268 and the anchoring elements 254 slide down the grooves 260, 262 in the converging guides 256, 258 into alinement with the carrier handle openings 32 through which the anchoring elements 254 are pushed by continued downward movement of the pusher.

As the pusher 264 approaches its lowermost position, the cam 270 swings the plate 268 into an out-of-the-way position, indicated in phantom in FIG. 16, in which it releases the applied handle. The arrow shaped handle anchors 254 engage the underside of the associated carrier 18 to anchor the carrying handle 20 in place so that the assembled carrying packs upon movement from the zone 160 are ready for carrying.

It may be observed that the handle applying action of the pusher 264 is effected during the previously described swinging movement of the carriage 164, which maintains the handle applying structure in alinement with the underlying carrier.

Operation of the pusher 264 in synchronization with movement of the packs through the zone 160 is effected by means of a collar 272 on the upper end of the plunger 266, FIG. 13, connected to the bifurcated, projecting end of a pivotally supported cam following lever 274, which carries a roller 276, FIG. 12, opposing the cam 180. The shape of the cam 180 is designed to move the pusher 264 downwardly in timed relation to operation of the machine. The pusher 264 is returned to its normal raised position by a compression spring 278, FIG. 13, coiled about the plunger 266 between the plate 190 and a collar 280 on the plunger.

A succession of handles 20 are supplied into underlying relation into the pusher 264, as described, from a magazine 282, FIGS. 3 and 14, mounted on one side of the housing 162. Successive layers of interconnected handles 20 are stacked together in the magazine 282 as shown in FIGS. 14 and 15. The bottom layer of handles is supported by two rotatable trip rods 284 in opposite sides of the magazine which define longitudinal notches 286 which receive and support the handle anchor elements 254 of the bottom layer of handles.

The trip rods 284 are operated in unison by a solenoid 288, FIGS. 3 and 14 which rotates the rods in opposite directions to turn the notches 286 inwardly and downwardly to drop the lowermost layer of handles onto a horizontal conveyor belt 290 mounted in the lower end of the magazine 28 and operated by a sprocket chain drive 291 powered by the shaft 166, as shown in FIG. 3.

Individual layers of handles 20 deposited on the conveyor 290 are moved inwardly by the conveyor onto a horizontal support plate 292, FIG. 14, which extends from the inner end of the conveyor into proximity to the normal position of the lower end of the pusher 264. The handles on the support plate 292 are continuously urged toward the pusher by the abutting engagement with these handles of other handles remaining on the conveyor 290.

The depletion of the supply of handles 20 on that portion of the conveyor 290 underlying the magazine 282 is sensed by a feeler 295, FIGS. 14 and 15, which actuates a switch 293 to energize the solenoid 288 to drop the next layer of handles onto the conveyor. In this manner, a supply of handles to the pusher 264 is continuously and automatically maintained while the machine is in operation.

While movement of the cans 14 and assembled carriers 18 into the zone 160 in timed relation to the carrier severing and handle applying means is provided by the synchronized energization of the conveyor 34, further assurance of proper synchronization of the movement of the assembled packs into the zone 160 can be provided by means of star wheels 294, FIGS. 2 and 20, positioned for engagement with the cans 14 moving through the zone 160. The star wheels 294 are driven in timed relation to operation of the carrier severing and handle applying mechanisms by a mechanical drive, including a sprocket wheel 296, FIG. 2, energized by the previously mentioned sprocket chain 114 driven by the shaft 54 of the carrier applying rotor 50.

It will be understood that the invention is not limited to the illustrated embodiment, but includes variants and alternatives within the scope of the invention as defined by the claims.

The invention is claimed as follows:

1. A machine for assembling a procession of containers into carrier packs held together by apertured carriers, comprising, in combination, carrier applying rotor means, means for supplying a procession of containers to an assembly station adjacent said rotor means, means for supplying a continuous interconnected series of apertured carriers to said rotor means in spaced relation to said assembly station, said rotor means including carrier applying elements for picking up said carriers from said supply means and moving the carriers into encircling relation to containers at said assembly station, means for directing away from said assembly station the containers and the interconnected carriers encircling the containers, and carrier severing means operated in timed relation to said rotor means for severing adjacent carriers from each other.

2. For use with a container filling and closing machine which discharges containers individually encircled at the upper ends thereof by radially extending beads, an attachment for forming packs of containers for carrying, comprising, in combination, means for supplying to a carrier feeding station a series of somewhat elastic carriers each defining a plurality of container receiving apertures, a carrier applying rotor having a periphery extending past said feeding station to an assembly station underlying the rotor, driving means connected to rotate said rotor cotinuously, means for directing containers from the machine to said assembly station in timed relation to rotary movement of said rotor, a circumferential series of carrier applying elements on said rotor adapted to pick up a succession of carriers at said feeding station, said carrier applying elements including spreader means adapted to fit into the apertures of carriers picked up at said feeding station and enlarge the carrier apertures as the spreader means moves from said feeding station to said assembly station; and said spreader means being movable, as an incident to continuous rotation of said rotor, into embracing relation to individual containers in said assembly station to fit the carriers around containers in the assembly station.

3. In a machine for assembling a procession of containers into carrying packs in which a plurality of containers are held togetther by a generally flat, somewhat elastic carrier having container receiving apertures therein, the combination of carrier applying rotor means, means for supplying a succession of apertured carriers to said rotor means at a supply station adjacent the periphery thereof, said rotor means including circumferentially spaced carrier applying elements thereon adapted to pick up successive carriers from the supply station, each of said carrier applying elements comprising a pair of shoes defining a pair of projecting elements adapted to fit into a carrier aperture and having the general form of segments of a truncated cone diverging outwardly away from each other, means for moving the two shoes of each pair away from each other as the shoes are moved away from said supply station, means for directing a procession of containers to an assembly station adjacent the path of said shoes and spaced from said supply station, and said rotor including means supporting said pairs of shoes for movement through said assembly station in an arcuate path as an incident to continuous rotation of said rotor to cause each pair of shoes entering the assembly station to embrace a container in said assembly station to assemble the container with a carrier moved by the shoes into the assembly station.

4. A machine for assembling a procession of containers from a filling and closing machine or the like with a succession of interconnected carriers to form separate carrying packs of containers held together by individual carriers, comprising, supply means for supplying an interconnected series of apertured carriers, rotor means, means for directing a succession of containers to an assembly station adjacent said rotor means, said rotor means including carrier applying elements for moving an interconnected series of apertured carriers from said supply means into telescoped assembled relation to containers in said assembly station, means for directing away from said assembly station the containers and said continuous series of carriers assembled thereon, container spacing means movable between adjacent containers assembled in adjoining carriers, means for operating said spacing means in timed relation to movement of said rotor means, and carrier severing means operated in timed relation to said rotor means for severing from each other carriers on opposite sides of said spacing means.

5. A machine for assembling into carrying packs a procession of containers issuing from a container filling and closing machine or the like, comprising, in combination, means for supplying a continuous series of interconnected carriers, means for directing a procession of containers to an assembly station, rotor means including a circumferential series of carrier applying elements thereon having fixed radial spacings from the axis of said rotor means and being adapted to pick up a series of carriers from said supply means and applying the carriers to the containers in said assembly station to encircle the containers, means for directing the procession of containers and the carriers applied thereto away from said assembly station, handle applying means operated in timed relaion to rotation of said rotor means for applying carrying handles to the individual carriers with the containers assembled therein, and means for severing adjacent carriers from each other.

6. A machine adapted to assemble a procession of containers from a container filling and closing machine or the like into individual carrying packs or containers, comprising, in combination, means for supplying a succession of apertured carriers, means for directing a procession of containers to an assembly station, endless means for picking up successive carriers from said supplying means and fitting the carriers into encircling relation to containers in said assembly station, means for inserting carrying bails into carriers fitted onto containers emerging from said assembly station, said bail inserting means including an opposed pair of bail guides converging downwardly in overlying relation to the path of carriers on containers moving from said assembly station, said guides being adapted to guide opposite ends of a bail downwardly in a predetermined path, vertically movable bail pushing means mounted in alinement with said guides for pushing individual bails downwardly along the guides into assembled relation to individual underlying carriers, and magazine means for supplying a succession of bails into alinement with said guides and said pushing means.

7. A machine for assembling a procession of containers into individual carrying packs comprising, in combination, means for supplying a succession of apertured and somewhat elastic carriers, means for directing a procession of containers to an assembly station, endless means including successive carrier applying elements thereon for moving successive carriers from said supplying means into encircling assembled relation to containers in said assembly station, means for directing the procession of containers and the carriers assembled thereon from said assembly station through a predetermined path, a pair of downwardly converging bail guides mounted in overlying alined relation to said path, a vertically movable bail inserting shoe mounted in alinement with said converging guides, magazine means for feeding a succession of carrying bails to said bail guides in underlying relation to said shoe, a bail holding element mounted on said shoe and having a normal position underlying the shoe to hold in alinement therewith a bail received from said magazine means, means for moving said shoe downwardly in timed relation to movement of said endless means to insert bails in underlying carriers, and means for swinging said bail holding element to an inoperative position as an incident to movement of said shoe to the lowermost position thereof.

8. A machine for assembling a succession of containers into carrying packs, comprising, in combination, means for directing a succession of containers to an assembly station, means for supplying a succession of apertured carriers, a series of carrier applying elements mounted for movement through a closed path extending past said supplying means and said assembly station, said carrier applying elements including means for picking up successive carriers from said supplying means and applying the carriers to the containers at said assembly station to encircle the individual containers in assembled relation thereto, means for directing assembled carriers and containers along a predetermined path, a carriage mounted in overlying relation to said path for limited movement therealong, means for moving said carriage a limited distance along said path in timed relation to movement of said carrier applying elements, a container spacing element mounted on said carriage for movement between containers assembled in adjoining carriers moving along said path, carrier severing means supported by said carriage and guided by said spacing element for severing adjacent carriers, handle inserting means supported by said carriage and including a downwardly movable element for inserting handles in successive carriers; and means for operating said container spacing element, said carrier severing means and said handle inserting element in timed relation to movement of said carrier applying elements.

9. A machine for assembling a procession of containers into a succession of carrying packs, comprising, in combination, a rotor including a circumferential series of carrier applying elements thereon, means for supplying an interconnected series of apertured carriers to said rotor, means for directing a procession of containers into coacting relationship with said rotor, said carrier applying elements including means for picking up successive interconnected carriers from said supplying means and applying the carriers into assembled encircling relation to containers supplied by the said directing means, means for directing assembled containers and carriers along a predetermined path, a carriage mounted in alinement with said path, means for moving said carriage repeatedly through a limited distance along said path in timed relation to movement of said rotor, carrier severing means mounted on said carriage for severing adjacent carriers traveling along said path, handle inserting means mounted on said carriage for inserting carrying handles in successive carriers moving along said path, and linkage means for operating said severing means and said handle inserting means in timed relation to movement of said rotor.

10. A machine for assembling a procession of containers into a succession of carrying packs, comprising, in combination, means for directing a procession of containers to an assembly station, a rotor mounted in operative association with said station, driving means connected to said rotor to rotate the latter continuously, a circumferentially spaced series of pairs of radially projecting carrier applying shoes mounted on said rotor to be carried by the latter through said assembly station in an arcuate path of movement as an incident to continuous rotation of said rotor, means for supplying a series of interconnected and apertured carriers to said rotor in spaced relation to said assembly station, said supplying means including means for shaping the interconnected carriers to have a form in transverse section which cups the marginal edges of the carriers defining the apertures therein radially inward to move into surrounding relation to successive shoes on said rotor, and means for moving corresponding shoes of each pair away from each other as the shoes approach said assembly station to expand the apertures in said carriers and fit the latter around containers in said assembly station.

11. A machine for assembling containers into carrying packs, comprising, in combination, means for directing containers to an assembly station, means for supplying apertured carriers, an endless series of carrier applying elements mounted for movement through a closed path which is free of abrupt changes in direction, said path extending past said supplying means and curving through said assembly station, driving means connected with said applying elements for driving the latter continuously through said assembly station, said carrier applying elements including means for picking up carriers from said supplying means and applying the carriers to the containers at said assembly station to encircle the individual containers in assembled relation thereto, means for directing assembled carriers and containers along a predetermined path, a carriage mounted in adjacent relation to said path, a container spacing element mounted on said carriage for movement between containers assembled in adjoining carriers moving along said path, carrier severing means supported by said carriage for severing adjacent carriers, and handle applying means supported by said carriage for applying handles to successive carriers.

12. A machine for assembling containers into carrying packs, comprising, in combination, means for directing containers to an assembly station, a rotor, driving means coacting with said rotor to rotate the latter continuously, said rotor including a circumferential series of carrier applying elements thereon movable by the rotor through said assembly station in an arcuate path as an incident to continuous rotation of the rotor, reel means for supplying a connected series of apertured and somewhat elastic carriers, timing means for directing interconnected carriers from said reel means onto said carrier applying elements in timed relation to movement of said rotor and at a location circumferentially spaced around the rotor from said assembly station, and said rotor and said applying elements being positioned in relation to said assembly station to place into assembled relation to containers in said assembly station carriers moved into the assembly station by said applying elements.

13. A machine for assembling containers into carrying packs, comprising, in combination, means for moving containers continuously through an assembly station, a rotor mounted in operative association with said station, driving means coacting with said rotor to rotate the latter continuously, a circumferential series of carrier applying shoes mounted on said rotor in pairs by means which effects movement of the shoes through said assembly station in an arcuate path as an incident to continuous rotation of said rotor, means for supplying a series of interconnected and apertured carriers to said rotor at a location circumferentially spaced from said assembly station, said supplying means including a feed roll around which interconnected carriers are trained and directed onto said applying shoes, said feed roll having a length less than the width of the carriers, carrier deflecting elements disposed at opposite ends of said feed roll to turn away from the axis of said rotor opposite side edges of carriers moving from said feed roll onto said applying shoes, and means for moving corresponding shoes of each pair away from each other as the shoes approach said assembly station to expand the apertures in the carriers on the shoes to fit the carriers around containers in said assembly station.

14. A machine for assembling a procession of containers into a successions of carrying packs, comprising, in combination, means for continuously moving a procession of containers through an assembly station, a rotor mounted in operative association with said station, driving means coacting with said rotor for continuously rotating the latter, a circumferential series of carrier applying shoes mounted on said rotor in pairs by means which moves the shoes through said assembly station in an arcuate path as an incident to continuous rotation of said rotor, means for supplying a series of interconnected and apertured carriers to said rotor in spaced relation to said assembly station, said supplying means including a carrier feed roll around which interconnected carriers are trained and directed onto said applying shoes on said rotor, said feed roll having a length less than the width of the carriers, a plurality of radial projections on said feed roll adapted to extend into the apertures of carriers trained therearound, means driving said feed roll in timed relation to said rotor to restrain movement of carriers moving from the roll to said rotor and thereby apply tension to carriers moving onto said shoes, means for deflecting away from said rotor the opposite side edges of carriers moving onto said shoes, and means for moving corresponding shoes of each pair away from each other as the shoes approach said assembly station to expand the apertures in the carriers on the shoes to fit the carriers around containers in said station.

15. A container and carrier assembling machine comprising, in combination, means for directing a procession of containers to a container and carrier assembly station, a carrier assembling rotor proximate to said assembly station, a circumferential series of pairs of carrier applying shoes mounted on said rotor to be moved by the latter through a circular path which extends through said assembly station to effect as an incident to movement of the shoes through said circular path an overlapping relationship of the shoes and containers in said assembly station, means for supplying to the periphery of said rotor at a location circumferentially spaced around the rotor from said assembly station a succession of somewhat elastic carriers each defining container receiving apertures therein, said pairs of carrier applying shoes being adapted to fit into apertures of carriers supplied from said supplying means and pick up the carriers, and means for operating said shoes to expand said carrier apertures for movement into embracing relation to containers in said assembly station as the shoes move along said circular path through said assembly station.

16. For use with a container filling and closing machine, an attachment for assembling containers discharged from the machine into packs for carrying, comprising, in combination, means for supplying to a carrier supply station a succession of elastic carriers which are generally flat in their normal position and which define respectively a plurality of container receiving apertures, means for moving containers from the machine into a carrier assembly station, an endless series of carrier applying elements, means for continuously moving said series of applying elements in procession through an endless path extending past said carrier supply station to said assembly station, said endless path being free of abrupt changes in direction thereof, said carrier applying elements being adapted to pick up a succession of carriers at said supply station as an incident to continuous movement of the applying elements along said path, said carrier applying elements including carrier aperture spreading components which fit into apertures of the carriers picked up at the supply station, operating means coacting with said carrier applying elements as an incident to continuous movement of the carrier applying elements along said path between said supply station and said assembly station for effecting movement away from each other of coacting aperture spreading components to enlarge the apertures of the associated carriers and said spreading components being movable into embracing relation to containers in said assembly station to fit the carriers around the containers in said assembly station as an incident to continuous movement of said carrier applying elements along said path through said assembly station.

17. A machine for assembling a procession of containers into packs for carrying, comprising, in combination, means defining a carrier and container assembly station, a carrier applying rotor proximate to said assembly station, means for rotating said rotor continuously, means for supplying to the periphery of said rotor at a location circumferentially spaced around the rotor from said assembly station a succession of normally flat somewhat elastic carriers each defining container receiving apertures therein, a plurality of pairs of carrier applying shoes mounted on said rotor in circumferentially spaced positions thereon, each pair of applying shoes being adapted to fit into an aperture of a carrier supplied from said carrier supplying means, means for moving the two applying shoes of each pair away from each other to enlarge the aperture of the carrier receiving the shoes as the pair of shoes progresses toward said assembly station, means for directing a procession of containers to said assembly station for continuous movement therethrough, and said rotor being positioned in relation to said assembly station to effect in said assembly station a telescoping relationship of containers in said assembly station and successive pairs of shoes moved into the assembly station by continuous rotation of said rotor.

18. Means for assembling a procession of containers into individual carrying packs each comprising a group of containers, said means comprising, in combination, means for supplying a succession of pack carriers, means for directing a procession of containers to an assembly station for continuous movement through said station, endless means supported for movement through an endless path which is free of abrupt changes in direction, driving means coacting with said endless means to continuously move the latter through said endless path, said endless path extending past said supply means and through said assembly station, said endless means including carrier applying means for moving successive carriers from said supply means into assembled relation to containers in said assembly station as an incident to continuous movement of said endless means through said path, means for directing the procession of containers with the carriers applied thereto away from said assembly station, handle applying means mounted for alignment with the procession of assembled containers and carriers moving away from said assembly station, a handle supply magazine mounted to supply a succession of handles to said handle applying means, and means for operating said handle applying means in timed relation to movement of said endless means to apply carrying handles to successive carriers emerging from said assembly station in assembled relation to containers.

19. For use wtih a container filling and closing machine or the like, a machine for assembling a procession of containers into carrier packs, comprising, in combination, means for directing a procession of containers to an assembly station, a rotor, driving means coacting with said rotor to rotate the latter continuously, said rotor including a circumferential series of carrier applying elements thereon having unvarying radial spacings from the axis of the rotor, said applying elements being movable through said assembly station as an incident to continuous rotation of said rotor, means for supplying a connected series of apertured and somewhat elastic carriers to said carrier applying elements in spaced relation to said assembly station, said carrier supplying means including means for paying out the interconnected carriers in timed relation to rotary movement of said rotor, and said carrier applying elements including means for moving carriers from said supplying means into assembled encircling relation to containers in said assembly station.

20. In a machine for assembling containers into packs, the combination of means for directing a procession of containers to an assembly station, rotor means proximate to said assembly station, driving means connected to said rotor means to rotate the latter continuously, means for supplying a succession of carriers to said rotor means at a supply station circumferentially spaced from said assembly station, said rotor means including a series of carrier applying shoes mounted on the periphery thereof in pairs and in unvarying spaced relation to the axis of said rotor means to pick up successive carriers from said carrier supplying means and applying the carriers into embracing relation to containers in said assembly station as an incident to continuous rotation of said rotor means, each pair of shoes defining opposed aperture spreading elements projecting radially outward to enter the aperture of a carrier at said assembly station, and means for moving the shoes of each pair toward and away from each other as the shoes approach said supply and assembly stations respectively.

21. A machine for asesmbling a procession of containers into packs for carrying, comprising, in combination, means defining a carrier and container assembly station, a carrier applying rotor proximate to said assembly station, driving means coacting with said rotor to rotate the latter continuously, means for supplying to said rotor at a location circumferentially spaced around the rotor from said assembly station a succession of carriers each defining container receiving apertures therein, a circumferential series of carrier applying shoes mounted on said rotor in pairs by means which provides for movement of the shoes through said assembly station in an arcuate path as an incident to continuous rotation of said rotor, each pair of shoes defining radially projecting lips adapted to fit into an aperture of a carrier supplied from said carrier supplying means, cam means for moving the two applying shoes of each pair away from each other to enlarge the aperture of the carrier receiving the lips of the shoes as the pair of shoes progresses toward said assembly station, and means for directing containers into positions in said assembly station in which the containers are embraced by the lips of said pairs of shoes moving into the assembly station.

22. A container and carrier assembling machine comprising, in combination, means for directing a procession of containers to a container and carrier assembly station, a carrier assembling rotor proximate to said assembly station, driving means connected with said rotor to rotate the latter continuously, a circumferential series of carrier applying shoes mounted on said rotor in pairs by means which provides for movement of the shoes through an arcuate path into overlapping relation to containers in said assembly station as an incident to continuous rotation of said rotor, means for supplying to said rotor at a location circumferentially spaced from said assembly station a succession of apertured carriers, and said pairs of carrier applying shoes defining diverging lips projecting radially outward to fit into apertures of carriers supplied from said supplying means and move the carriers into telescoped relation to containers in said assembly station.

23. A machine for assembling containers into packs for carrying, comprising, in combination, means for supplying to a carrier supply station a succession of carriers each defining a plurality of container receiving apertures, an endless series of carrier applying elements, means for moving all of said applying elements continuously through a closed path free of abrupt changes in direction and extending past said carrier supply station and curving through an assembly station spaced from said supply station, means for continuously moving a succession of containers through said assembly station in timed relation to movement of said carrier applying elements through the assembly sation, and said carrier applying elements being adapted to pick up a succession of carriers at said supply station and fit the carriers around containers moving through said assembly station to hold the containers in assembled packs for carrying.

24. A machine for assembling a procession of containers into a succession of carrying packs, comprising, in combination, a rotor including a circumferential series of carrier applying elements thereon having a substantially unvarying radial spacing from the axis of said rotor, driving means coacting with said rotor to continuously rotate the latter, means for supplying an interconnected series of apertured carriers to said rotor, means for moving a procession of containers continuously into coacting relationship with said rotor and providing for continuous movement of the containers in synchronism with the rotor while the containers have a coacting relationship to the rotor, said carrier applying elements including means for picking up successive interconnected carriers from said supplying means and applying the carriers into assembled encircling relation to containers supplied by the said directing means as an incident to continuous rotation of said rotor, means for directing assembled containers and carriers along a predetermined path, a carriage mounted in alignment with said path, means for moving said carriage repeatedly through a limited distance along said path in timed relation to movement of said rotor, handle applying means mounted on said carriage for applying carrying handles to successive carriers moving along said path, and means for operating said handle applying means in timed relation to movement of said rotor.

25. For application to the discharge side of a container producing machine, an attachment for assembling containers into container packs, comprising, in combination, means for supplying to a carrier supply station a succession of carriers each defining a plurality of apertures for receiving containers, a carrier applying rotor having a periphery extending past said supply station and curving through an assembly station underlying the rotor, driving means coacting with said rotor to rotate the latter continuously, means for supplying containers from the machine to said assembly station for continuous movement through said assembly station in synchronism with continuous rotation of said rotor, and a peripheral series of carrier applying elements mounted on said rotor in positions having substantially unvarying radial spacings from the axis of said rotor and being adapted to pick up a succession of carriers at said supply station and apply the carriers to containers continuously moving through said assembly station as an incident to rotation of the rotor.

26. In a machine for assembling containers in packs held together by generally flat somewhat elastic carriers, the combination of a rotor, driving means coacting with said rotor to rotate the latter continuously, means for directing a continuous procession of containers to a carrier and container assembly station proximate to the periphery of said rotor for continuous movement through the assembly station in synchronism with rotation of said rotor, means for supplying a succession of carriers to said rotor at a location circumferentially spaced around the rotor from said assembly station, said rotor including carrier applying means supported thereon for movement through said assembly station in an arcuate path as an incident to continuous rotation of the rotor, and said carrier applying means including carrier engaging components adapted to engage and to pick up successive carriers from said carrier supplying means and being shaped and positioned in relation to said path to move the carriers into embracing relation to containers moving continuously through said assembly station as an incident to continuous movement of said carrier applying means along said arcuate path through said assembly station.

27. For application to the discharge side of a container producing machine, an attachment for assembling containers into carrying packs, comprising, in combination, means for supplying a succession of carriers to a supply station, a carrier applying rotor including an endless succession of carrier applying means thereon having substantially unvarying radial spacings from the axis of the rotor, driving means coacting with said rotor to continuously rotate the latter, said rotor being positioned to move said carrier applying means past said carrier supply station and to move the carrier applying means continuously in an arcuate path through an assembly station as an incident to continuous rotation of the rotor, means for supplying a procession of containers to said assembly station for continuous movement therethrough in synchronism with continuous rotation of said rotor, and said carrier applying means on said rotor being adapted to pick up carriers from said supply station and apply the carriers to containers continuously moving through said assembly station as an incident to continuous rotation of said rotor.

28. In a machine for assembling a continuously moving procession of containers into packs for carrying, the combination of endless carrier applying means, means for continuously circulating said carrier applying means through a closed path free of abrupt changes in direction and extending continuously through an assembly station, means for supplying a continuous procession of containers to said assembly station for continuous movement through said assembly station in synchronism with the continuous movement of said carrier applying means through the assembly station, carrier supply means for supplying a succession of carriers to said endless carrier applying means continuously circulating through said closed path, and said carrier applying means including means for moving carriers supplied by said supply means into assembled relation to containers moving through said assembly station to form assembled packs of containers.

29. In a machine for assembling a continuously moving procession of containers into packs for carrying, the combination of a rotor, an annular array of carrier applying means on said rotor, means for continuously rotating said rotor to effect continuous movement of said carrier applying means through an assembly station, means for supplying a continuous procession of containers to said assembly station for continuous movement through said assembly station in synchronism with the continuous movement of said carrier applying means through the assembly station, carrier supply means for supplying a succession of apertured carriers to said carrier applying means on said continuously rotating rotor, and said carrier applying means including means for moving carriers supplied by said supply means into embracing relation to containers continuously moving through said assembly station to form assembled packs of containers.

30. Means for assembling a procession of containers into individual carrying packs each comprising a group of containers, said means comprising, in combination, means for supplying a succession of pack carriers, means for directing a procession of containers to an assembly station for continuous movement through said station, endless means supported for movement through an endless path which is free of abrupt changes in direction, driving means coacting with said endless means to continuously move the latter through said endless path, said endless path extending past said supply means and through said assembly station, said endless means including carrier applying means for moving successive carriers from said supply means into assembled relation to containers in said assembly station as an incident to continuous movement of said endless means through said path, and means for directing the procession of containers with the carriers applied thereto away from said assembly station.

References Cited in the file of this patent

UNITED STATES PATENTS

| | | |
|---|---|---|
| 2,864,212 | Bruce | Dec. 16, 1958 |
| 2,929,181 | Ponpitch | Mar. 22, 1960 |